(12) United States Patent
Park et al.

(10) Patent No.: US 7,924,758 B2
(45) Date of Patent: Apr. 12, 2011

(54) ENERGY-AWARE ROUTING APPARATUS AND METHOD

(75) Inventors: Yongsuk Park, Seoul (KR); Eun Sun Jung, Seoul (KR); Jong Ho Bang, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 877 days.

(21) Appl. No.: 11/882,509

(22) Filed: Aug. 2, 2007

(65) Prior Publication Data

US 2008/0075028 A1 Mar. 27, 2008

(30) Foreign Application Priority Data

Sep. 26, 2006 (KR) .................. 10-2006-0093221

(51) Int. Cl.
*G08C 17/00* (2006.01)
(52) U.S. Cl. ........................................ 370/311
(58) Field of Classification Search ....... 370/310.2–314, 370/328–339
See application file for complete search history.

(56) References Cited

U.S. PATENT DOCUMENTS

| | | | |
|---|---|---|---|
| 6,895,450 | B2 | 5/2005 | Mahany et al. |
| 7,035,677 | B2 | 4/2006 | Orlik et al. |
| 2004/0233881 | A1* | 11/2004 | Kang et al. .................. 370/338 |
| 2005/0135360 | A1* | 6/2005 | Shin et al. .................. 370/389 |

FOREIGN PATENT DOCUMENTS

| | | |
|---|---|---|
| JP | 2005-217548 | 8/2005 |
| JP | 2005-295310 | 10/2005 |
| JP | 2006-041633 | 2/2006 |

OTHER PUBLICATIONS

Manvi et al, An agent-based model for topology discovery and routing information fusion in mobile ad-hoc networks, Indian Institute of Science, 16 pages, 2006.*
Toh, Maximum Battery Life Routin to Support Ubiquitous Mobile Computing in Wireless Ad Hoc Networks, IEEE, 10 pages, Jun. 2001.*
Singh et al, Power-Aware Routing in Mobile Ad Hoc Networks, ACM, 10 pages, 1998.*
Maleki et al, Power-aware Source Routing Protocol for Mobile Ad Hoc Networks, ACM, 4 pages, 2002.*

* cited by examiner

*Primary Examiner* — Frank Duong
(74) *Attorney, Agent, or Firm* — NSIP Law, PC (57) ABSTRACT

An energy-aware routing method and energy-aware routing system, the energy-aware routing apparatus for use with a multi-hop system including at least one terminal and at least one base station, the apparatus includes a transceiving unit for receiving a route request message including battery information from each of the at least one terminal; and a control unit for receiving the route request message from the transceiving unit and selecting a communication path from configurable paths by using the battery information.

22 Claims, 4 Drawing Sheets

ENERGY-AWARE ROUTING APPARATUS AND METHOD

CROSS-REFERENCE TO RELATED APPLICATION

This application claims the benefit under 35 U.S.C. §119(a) of Korean Patent Application No. 10-2006-0093221, filed on Sep. 26, 2006, in the Korean Intellectual Property Office, the entire disclosure of which is hereby incorporated by reference.

BACKGROUND OF THE INVENTION

1. Field of the Invention

The present invention relates to an energy-aware routing apparatus and method. More particularly, the present invention relates to an energy-aware routing apparatus and method which perform routing based on energy information to thereby extend system lifetime.

2. Description of Related Art

In modern society, a variety of multimedia services are provided for use at any time and in any place due to a development of the Internet and mobile communication technology. Particularly, small-size portable devices such as notebook personal computers (PC) and personal digital assistants (PDA) have currently come into wide use. More particularly, such devices are used for Internet-based data communication via both wired and wireless networks.

Multi-hop cellular networks (MCN) are wireless networks that reduce dead zones, extend network coverage, and increase network capacity by connecting relay stations and mobile terminals in multi-hop systems.

Under such an MCN environment, signal strength information may be used when determining a multi-hop path. When considering the limited battery power of mobile terminals, determining the multi-hop path only with signal strength information is disadvantageous in terms of system lifetime, since the mobile terminal is used as a node and a mobile terminal battery is quickly exhausted.

Accordingly, there is a need for an energy-aware routing apparatus and method which use battery information when selecting a path to thereby select a path which is capable of extending system lifetime.

SUMMARY OF THE INVENTION

Exemplary embodiments of the present invention address at least the above problems and/or disadvantages and provide at least the advantages described below. Accordingly, an aspect of exemplary embodiments of the present invention is to provide an energy-aware routing apparatus and method which use battery information when selecting a path to thereby select a path which is capable of extending system lifetime.

According to an aspect of the present invention, an energy-aware routing apparatus which is applied to a multi-hop system comprising at least one terminal and at least one base station is provided. The apparatus includes a transceiving unit for receiving a route request message including battery information from each of the at least one terminal; and a control unit for receiving the route request message from the transceiving unit and selecting a communication path from configurable paths by using the battery information.

In this embodiment, the battery information indicates a battery power status of each of the at least one terminal, as at least one of a high level, a medium level, a low level, and a critical level.

Also, the battery information preferably further indicates at least one of a number of terminals with a high level status (the battery power status as the high level), a number of terminals with a medium level status, a number of terminals with a low level status, and a number of terminals with a critical level status, from the plurality of terminals on a single path.

According to an aspect of the present invention, an energy-aware routing apparatus which is applied to a multi-hop system comprising at least one terminal, at least one relay, and at least one base station is provided. The apparatus includes a transceiving unit for receiving a route request message including energy-aware information from each of the at least one terminal or relay; and a control unit for receiving the route request message from the transceiving unit and selecting a communication path from at least one configurable path by using the energy-aware information.

In this embodiment, the energy-aware information includes battery information, and the battery information indicates a battery power status of each of the at least one terminal, as at least one of a high level, a medium level, a low level, and a critical level. Of course, these particular levels are selected to illustrate an embodiment of the invention, and those of ordinary skill in the art will appreciate that any suitable levels may be used without departing from the scope and spirit of the present invention.

Also, the battery information preferably further indicates at least one of a number of terminals with a high level status, a number of terminals with a medium level status, a number of terminals with a low level status, and a number of terminals with a critical level status, from the plurality of the terminals on a single path.

Also, the control unit selects a path having a terminal with a highest level status, the terminal being selected from among terminals with a lowest level status on each of the terminals' respective at least one configurable path.

Also, the control unit selects a path having a fewest number of terminals with a lowest level status on each of the at least one configurable path, as the communication path.

Also, the energy-aware information includes at least one of hop-count information and relay number information, and the hop-count information indicates a number of hops on the at least one configurable path, and the relay number information indicates a number of relays on the at least one configurable path.

Also, the control unit, when the number of relays is greater than or equal to 1, selects a path having a smallest number of hops of the hop-count information from the at least one configurable path, as the communication path, or selects a path having a greatest number of relays when the number of hops is identical with respect to the at least one configurable path, as the communication path. Furthermore, the control unit, when the number of relays of the relay number information is 0, selects a path having the smallest number of hops of the hop-count information from the at least one configurable path, as the communication path, or selects a path where the route request message is first received when the number of hops is identical with respect to the at least one configurable path, as the communication path.

According to an aspect of the present invention, an energy-aware routing apparatus which is applied to a multi-hop system comprising at least one terminal, at least one relay, and at least one base station is provided. The apparatus includes a transceiving unit for receiving a route request message, and forwarding the route request message according to a first control signal; and a control unit for receiving the route request message from the transceiving unit, checking an amount of battery power remaining, generating the first control signal which controls a retransmission of the route request message according to a result of the checking, and outputting the first control signal to the transceiving unit.

In this embodiment, the control unit compares a threshold value, which is included in the route request message, and a value of the battery power remaining, and generates the first control signal to prevent the route request message from being forwarded when the value of the amount of battery power remaining is less than the threshold value, or to forward the route request message when the value of the amount of battery power remaining is greater than the threshold value.

Also, the control unit inserts battery information in the route request message, and the battery information indicates the amount of the battery power remaining, as at least one of a high level, a medium level, a low level, and a critical level.

Also, the energy-aware routing apparatus preferably further includes a storing unit, and the control unit generates a second control signal which controls a delay time prior to forwarding the route request message according to a remaining amount of the storing unit, and the transceiving unit forwards the route request message after delaying the route request message according to the second control signal.

Also, the control unit checks an energy consumption status of the control unit and generates a third control signal which controls the retransmission of the route request message according to a result of the checking, and the transceiving unit checks the third control signal which is inputted from the control unit when the retransmission of the route request message is determined by the first control signal and forwards the route request message according to the third control signal.

Also, the control unit preferably updates hop-count information, which counts a number of hops on configurable paths, with the hop-count information reflecting a virtual hop count which is preferably proportional to or otherwise based on an energy consumption status of the control unit or another variable or set of variables in the system, and the hop-count information is referred to by the base station when selecting a path.

According to an aspect of the present invention, an energy-aware routing method which is applied to a multi-hop system comprising at least one terminal, at least one relay, and at least one base station is provided. The method includes receiving a route request message including energy-aware information from any one of each of the at least one terminal and each of the at least one relay; and selecting a communication path from at least one configurable path by using the energy-aware information.

Also, the energy-aware information includes at least one of hop-count information and relay number information. The hop-count information indicates a number of hops on the at least one configurable path, and the relay number information indicates a number of relays on the at least one configurable path. When the number of relays of the relay number information is greater than 1, a path having a smallest number of hops of the hop-count information from the at least one configurable path, or a path having a greatest number of relays when the number of hops of the at least one configurable path is identical with respect to the at least one configurable path, is selected as the communication path. When the number of relays of the relay number information is 0, a path having the smallest number of hops of the hop-count information from the at least one configurable path, or a path where the route request message is first received when the number of hops is identical with respect to the at least one configurable path, is selected as the communication path.

According to an aspect of the present invention, an energy-aware routing method which is applied to a multi-hop system comprising at least one terminal, at least one relay, and at least one base station is provided. The apparatus includes receiving a route request message; checking an amount of battery power remaining when the route request message is received; and determining whether to forward the route request message according to a result of the checking.

Also, the energy-aware routing method preferably further comprises updating hop-count information, which counts a number of hops on configurable paths in the route request message, with hop-count information reflecting a virtual hop number which is preferably proportional to or otherwise based on an energy consumption status of the control unit or another variable or set of variables in the system, wherein the hop-count information is referred to by the base station when selecting a path.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
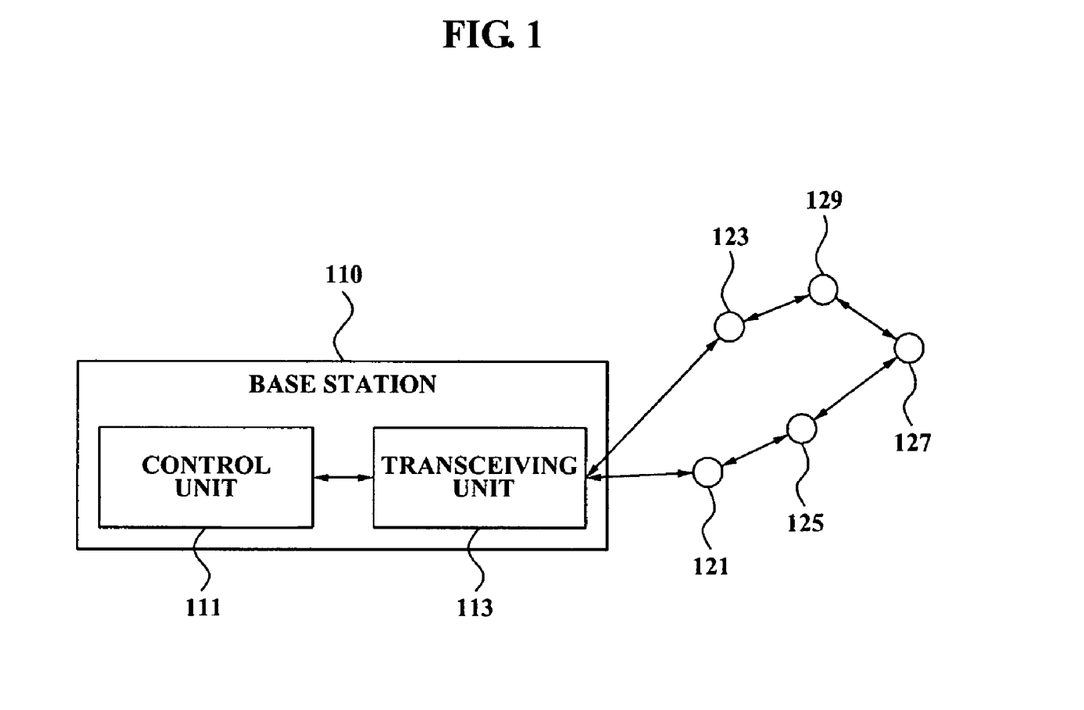
FIG. 1 is a block diagram illustrating an energy-aware routing apparatus applied to a base station according to an embodiment of the present invention.

FIG. 1 is a block diagram illustrating an energy-aware routing apparatus 110 applied to a base station according to an embodiment of the present invention. The energy-aware routing apparatus 110 according to an embodiment of the present invention includes a control unit 111 and a transceiving unit 113.

The control unit 111 receives a route request message (RREQ) from the transceiving unit 113. Also, the control unit 111 selects a communication path from configurable paths by using battery information. The configurable paths approach a target node 127 and include a path from a node 123 to the target node 127 via a node 129, or a path from a node 121 to the target node 127 via a node 125 as shown in FIG. 1. In this embodiment, the battery information may indicate a battery power status of each of the nodes 121, 123, 125, 127 and 129, as at least one of a high level, a medium level, a low level, and a critical level. Also, the battery information may indicate at least one of a number of nodes with a high level (high level battery power status) (H_count), the number of nodes with a medium level (M_count), a number of nodes with a low level (L_count), and a number of nodes with a critical level (C-count), from the plurality of nodes on a single path.

Also, the transceiving unit 113 receives the route request message, including the battery information from each of the nodes, from the nodes 121 and 123, and transmits the received route request message to the control unit 111.

Each of the nodes 121, 123, 125, 127 and 129 may be any one of a mobile terminal and a dedicated relay. However, the nodes 121, 123, 125, 127 and 129 are not limited to the mobile terminal and the dedicated relay. An operation of a base station 110 in a multi-hop environment, which includes the mobile terminal and the dedicated relay, will now be described in detail.

The control unit 111 receives the route request message from the transceiving unit 113. Also, the control unit 111 selects the communication path from at least one configurable path by using energy-aware information. The at least one configurable path includes the path from the node 123 to the target node 127 via the node 129, or the path from the node 121 to the target node 127 via the node 125 as shown in FIG. 1. In this embodiment, the battery information may indicate the battery power status of each of the nodes 121, 123, 125, 127 and 129, as at least one of the high level, the medium level, the low level, and the critical level. Also, the battery information may indicate at least one of the number of nodes with the high level (H_count), the number of nodes with the medium level (M_count), the number of nodes with the low level (L_count), and the number of nodes with the critical level status (C-count), from the plurality of nodes on the single path.

The control unit 111 may select a path having a terminal with a highest level status, the terminal being selected from among terminals with a lowest level status on each of the terminals' respective at least one configurable path, as the communication path. In this embodiment, levels of the battery power status decrease in an order of the high level, the medium level, the low level, and the critical level. Also, the control unit 111 may select a path having a fewest number of terminals with a lowest level status on each of the at least one configurable path, as the communication path.

The energy-aware information includes at least one of hop-count information and dedicated relay number information. The hop-count information indicates a number of hops on the at least one configurable path, and the dedicated relay number information indicates a number of dedicated relays on the at least one configurable path.

When the number of dedicated relays is greater than or equal to 1, the control unit 111 selects a path having a small number of hops of the hop-count information from the at least one configurable path, as the communication path. When the number of relays is greater than or equal to 1 and the number of hops is identical with respect to the at least one configurable path, the control unit 111 selects a path having a greatest number of dedicated relays, as the communication path. Specifically, when the number of hops is identical with respect to the at least one configurable path, it is preferable that the control unit 111 selects a path having a large number of dedicated relays which have a regular supply of power, that is, a path having a relatively small number of mobile terminals, in terms of battery power required.

Also, when the number of dedicated relays of the relay number information is 0, the control unit 111 selects the path having the smallest number of hops according to the hop-count information from the at least one configurable path, as the communication path. When the number of relays of the relay number information is 0 and the number of hops is identical with respect to the at least one configurable path, the control unit 111 selects the path where the route request message is first received, as the communication path.

The transceiving unit 113 receives the route request message, including the energy-aware information from each of the nodes, from the nodes 121 and 123, and transmits the received route request message to the control unit 111.

Figure 2:
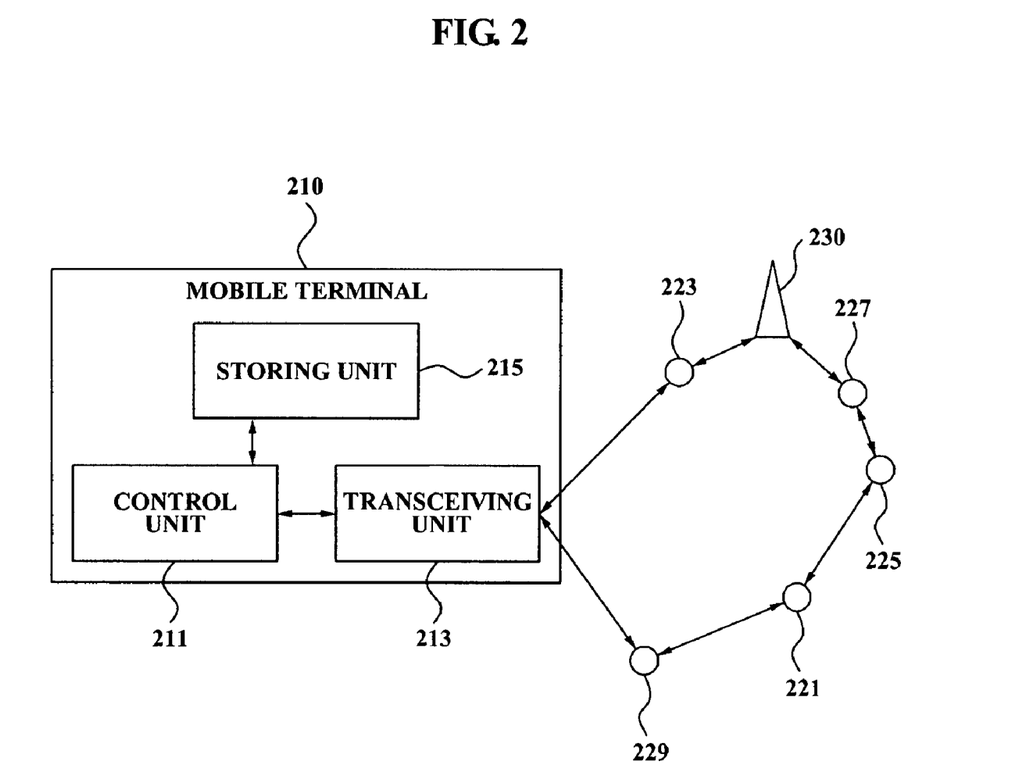
FIG. 2 is a block diagram illustrating an energy-aware routing apparatus applied to a mobile terminal according to an embodiment of the present invention.

FIG. 2 is a block diagram illustrating an energy-aware routing apparatus applied to a mobile terminal according to an embodiment of the present invention.

The energy-aware routing apparatus according to an embodiment of the present invention includes a control unit 211, a transceiving unit 213, and a storing unit 215.

The control unit 211 receives a route request message from the transceiving unit 213, and checks an amount of battery power remaining. In this embodiment, the amount of battery power remaining corresponds to a battery installed in the mobile terminal 210. The control unit 211 generates a first control signal which controls a retransmission of the route request message according to a result of the checking, and outputs the first control signal to the transceiving unit 213. The control unit 211 compares a threshold value, which is included in the route request message, and a value of the amount of battery power remaining. The control unit 211 generates the first control signal to prevent the route request message from being forwarded, when the value of the amount of battery power remaining is less than the threshold value. Also, the control unit 211 generates the first control signal to forward the route request message, when the value of the amount of battery power remaining is greater than or equal to the threshold value. Specifically, the control unit 211 prevents the route request message from being forwarded when the amount of battery power remaining is small, that is, a battery power status corresponds to a critical level.

The threshold value may be determined according to energy consumption characteristics for a target application of the route request message. Specifically, different applications, such as file transfer protocol services (FTP), voice over Internet protocol services (VoIP), and video on demand services (VOD) require different energy consumption amounts, and thus the threshold value may be controlled respectively. For example, in the case of a VOD service, it is preferable that a high threshold value be set due to the relatively large amount of battery power required.

The control unit 211 inserts battery information in the route request message. The battery information indicates the amount of the battery power remaining, as at least one of a high level, a medium level, a low level, and a critical level. In this embodiment, when previously inserted information exists in the battery information in the route request message, the control unit 211 compares an amount of battery power remaining per the previously inserted information (old_Emin_i) and an amount of battery power remaining in the mobile terminal 210 (current_Emin_i). When the amount of battery power remaining per the previously inserted information (old_Emin_i) is greater than the amount of battery power remaining in the mobile terminal 210 (current_Emin_i), the control unit 211 updates the battery information in the route request message with a value indicating the amount of battery power remaining in the mobile terminal 210.

When the value indicating the amount of battery power remaining of the mobile terminal 210 is less than the threshold value, the mobile terminal 210 simultaneously transmits a reinitiate request message and an alarm message to a source node, and thereby reduces a service load. In this embodiment, the source node which receives the reinitiate request message may generate and transmit a new route request message.

The transceiving unit 213 receives the route request message from nodes 223 and 229. Also, the transceiving unit 213 receives a first control signal from the control unit 211, and forwards the route request message according to the first control signal.

The storing unit 215 stores data according to the control unit 211, and provides the control unit 211 with the stored data according to a request of the control unit 211.

Also, the control unit 211 generates a second control signal which controls a delay time prior to forwarding the route request message according to a remaining amount of storage of the storing unit 215. The transceiving unit 213 forwards the route request message after delaying the route request message according to the second control signal. Specifically, when the remaining amount of storage of the storing unit 215 is relatively small, the control unit 211 controls the route request message to be forwarded after a longer delay. Accordingly, a path including the mobile terminal 210 may not be a communication path when routing.

Also, the control unit 211 checks an energy consumption status of the control unit 211, and generates a third control signal which controls the retransmission of the route request message according to a result of the checking. The transceiving unit 213 forwards the route request message according to the third control signal. Specifically, when a workload of the control unit 211 is extremely high, the control unit 211 controls the route request message not to be forwarded. The control unit 211 updates hop-count information, which counts a number of hops on configurable paths, with the hop-count information reflecting a virtual hop count which is preferably proportional to or otherwise based on the energy consumption status of the control unit 211 or another variable or set of variables in the system. Specifically, when the workload of the control unit 211 is high, the control unit 211 controls the number of hops in the hop-count information to be artificially increased. Accordingly, the path including the mobile terminal 210 may not be the communication path, when selecting a path.

With reference to FIGS. 1 and 2, an operation of the energy-aware routing apparatus according to an embodiment of the present invention is described in detail below.

As an embodiment of the present invention, a multi-hop cellular network (MCN) is described as an example. The MCN comprises base stations 110 and 230, a mobile terminal 210, and nodes, 121, 123, 125, 127, 129, 221, 223, 225, 227, and 229, which includes a dedicated relay. However, the energy-aware routing apparatus according to an embodiment of the present invention is not limited thereto. Also, the energy-aware routing apparatus is applicable to any type of network including a terminal and a base station where an interface which enables a data transmission is applied.

A method of routing of the energy-aware routing apparatus according to an embodiment of the present invention by checking a number of dedicated relays in energy-aware information is described in detail below.

When the base stations 110 and 230 receive a route request message from each of the nodes 121, 123, 125, 127, 129, 221, 223, 225, 227, and 229, the base stations 110 and 230 check dedicated relays number information in the route request message. The dedicated relays count information is formed by increasing and forwarding the dedicated relays count information, when the dedicated relay of the nodes 121, 123, 125, 127, 129, 221, 223, 225, 227, and 229 forwards the route request message. The base stations 110 and 230 may ascertain the number of dedicated relays on configurable paths.

The base stations 110 and 230 check hop-count information in the route request message, when the number of dedicated relays is 0, that is, a dedicated relay does not exist on the configurable paths. The hop-count information indicates how many nodes perform relaying on the configurable paths of the base stations 110 and 230. In FIG. 1, for a first path, from the node 127 to the base station 110 via the nodes 129 and 123, the number of hops is three. In FIG. 2, for a second path, from the node 229 to the base station 230 via the nodes 221, 225 and 227, the number of hops is four.

Then, the base stations 110 and 230 select a path having a least number of hops, as a communication path. Specifically, the base station 230 of FIG. 2 selects a third path from the second path and the third path, since the number of hops of the third path is less than the number of hops of the second path.

When the number of hops is identical with respect to the configurable paths, the base stations 110 and 230 select a path where the route request message is first received, as the communication path. Specifically, in FIG. 1, the number of hops of the first path is identical to the number of hops of a fourth path, from the node 127 to the node 110 via the nodes 125 and 121. Accordingly, the base station 110 selects the path where the route request message is first received, from the first path or from the fourth path, as the communication path.

When the number of dedicated relays in the route request message is greater than 0, that is, a dedicated relay exists on the configurable paths, the base stations 110 and 230 check the number of hops in the route request message.

Then, the base stations 110 and 230 select the path having a least number of hops, as the communication path. In this embodiment, it is preferable that the base stations 110 and 230 first check the number of hops when routing. However, the base stations 110 and 230 may first check the number of dedicated relays.

When the number of dedicated relays is not identical, the base stations 110 and 230 select a path having a greatest number of dedicated relays, as the communication path. When the number of dedicated relays is identical, the base stations 110 and 230 may select the path where the route request message is first received, as the communication path.

A method of routing of the energy-aware routing apparatus according to an embodiment of the present invention by checking battery information, a threshold value, and the like in energy-aware information, is described in detail below.

When the mobile terminal 210 receives a route request message, the mobile terminal 210 compares a value of an amount of battery power remaining and a threshold value in the route request message. When the value of the amount of battery power remaining is less than the threshold value, the mobile terminal 210 does not forward the route request message. Specifically, the base stations 110 and 230 may not receive the route request message via a path including a mobile terminal which has the value of the amount of battery power remaining less than the threshold value. Accordingly, the mobile terminal 210 does not select the path including the mobile terminal, as the communication path.

The threshold value may be controlled considering each application has a different energy consumption amount. Specifically, VOD-related data consumes more energy than FTP-related data and VoIP-related data. Accordingly, it is preferable that a relatively high threshold value is set.

The mobile terminal 210 may forward a reinitiate request message, i.e. an alarm message, to a source node, when the capacity of battery power remaining is less than the threshold message.

Also, the base stations 110 and 230 may select the communication path by referring to a minimum energy level information. The minimum energy level information is included in the energy-aware information in the route request message. Also, the minimum energy level information indicates a minimum amount of battery power remaining of each node, on configurable paths. The base stations 110 and 230 may select a path having a greatest minimum amount of battery power remaining from the minimum amount of battery power remaining of each node on the configurable paths, as the communication path. Also, the minimum energy level information may indicate a number of terminals which have the minimum amount of battery power remaining of each node on the configurable paths. The base stations 110 and 230 may select a path having a fewest number of terminals which have the minimum amount of battery power remaining on the configurable paths, as the communication path.

In this embodiment, when the mobile terminal 210 receives the route request message, the mobile terminal 210 checks the minimum energy level information included in the energy-aware information in the route request message. Only when the amount of battery power remaining of the mobile terminal 210 is less than the amount of battery power remaining which is indicated by the minimum energy level information, the mobile terminal 210 may update the minimum energy level information with the amount of battery power remaining of the mobile terminal 210.

When the mobile terminal 210 receives the route request message, the mobile terminal 210 records the amount of battery power remaining of the mobile terminal 210, in the energy-aware information. Also, the mobile terminal 210 may forward the route request message after inserting such battery information in the route request message. The battery information indicates a value of the amount of battery power remaining, as at least one of a high level, a medium level, a low level, and a critical level. Specifically, the base stations 110 and 230 check the battery information, and may select a path having a node with a highest level status from the nodes with a lowest level status on the configurable paths, as the communication path.

Also, the battery information may indicate at least one of a number of nodes with a high level, a number of nodes with a medium level, a number of nodes with a low level, and a number of nodes with a critical level, from the plurality of the nodes on a single path. Specifically, the base stations 110 and 230 check the battery information, and may select a path having a fewest number of nodes with the critical level status on the configurable paths, as the communication path.

A method of routing of the energy-aware routing apparatus, according to an embodiment of the present invention, by checking a memory status and driving electrical power, is described in detail below.

When an amount of remaining storage of the storing unit 215 is small, the mobile terminal 210 delays the route request message for a predetermined time, and forward the route request message. Specifically, the base station 230 receives the route request message from a path, which includes the mobile terminal 210 with a small amount of remaining storage of the storing unit 215, later than the route request message from another path. Accordingly, the base station 230 may not select the path having the mobile terminal 210 with the small amount of remaining storage of the storing unit 215.

Also, when the driving electrical power of the control unit 211 is extremely high, the mobile terminal 210 does not forward the route request message. Specifically, the base station 230 may not receive the route request message via a path having the mobile terminal 210 where the driving electrical power of the control unit 211 is extremely high. Accordingly, the base station 230 does not select the path having the mobile terminal 210, as the communication path.

When the driving electrical power of the control unit 211 is comparatively high, the mobile terminal 210 may forward the route request message, after artificially increasing a number of hops in the route request message. Specifically, while the route request message passes the mobile terminal 210, the number of hops is required to be increased by 1. However, the mobile terminal 210 may forward the route request message by increasing the number of hops by 2, when the driving electrical power of the control unit 211 is comparatively high. Accordingly, the base station 230 may not select the path having the mobile terminal 210, as the communication path.

Figure 3:
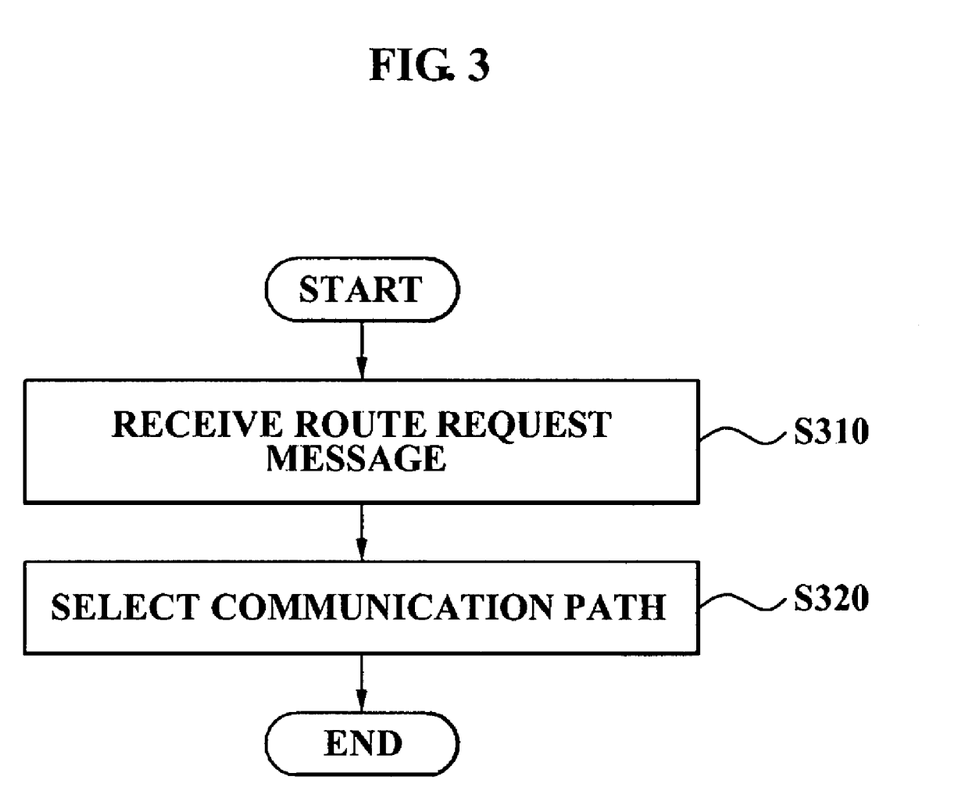
FIG. 3 is a flowchart illustrating an operation of a base station of an energy-aware routing apparatus according to an embodiment of the present invention.

FIG. 3 is a flowchart illustrating an operation of a base station of an energy-aware routing apparatus according to an embodiment of the present invention.

In operation S310, a base station 110 of FIG. 1 receives a route request message including energy-aware information, from nodes 121 and 123. The nodes 121 and 123 include a mobile terminal or a dedicated relay.

In operation S320, the base station 110 selects a communication path from at least one configurable path, that is, from the node 123 to a node 127 via a node 129, or from the node 121 to the node 127 via a node 125, by using the energy-aware information in the route request message. Specifically, the base station 110 may select a path having the mobile terminal which has a great amount of battery power remaining, or select a path having many dedicated relays where an electric power supply is stable, as a communication path.

Specifically, the energy-aware information includes at least one of hop-count information and relay number information. The hop-count information indicates a number of hops on the at least one configurable path, and the relay number information indicates a number of relays on the at least one configurable path. In operation S320, when the number of relays is greater than or equal to 1, the base station 110 selects a path having a small number of hops of the hop-count information from the at least one configurable path as the communication path. When the number of relays is greater than or equal to 1 and the number of hops is identical with respect to the at least one configurable path, the base station 110 selects a path having a greatest number of relays, as the communication path. Also, when the number of relays of the relay number information is 0, the base station 110 selects a path having the small number of hops of the hop-count information from the at least one configurable path, as the communication path. When the number of relays of the relay number information is 0 and the number of hops is identical with respect to the at least one configurable path, the base station 110 selects a path where the route request message is first received, as the communication path.

Figure 4:
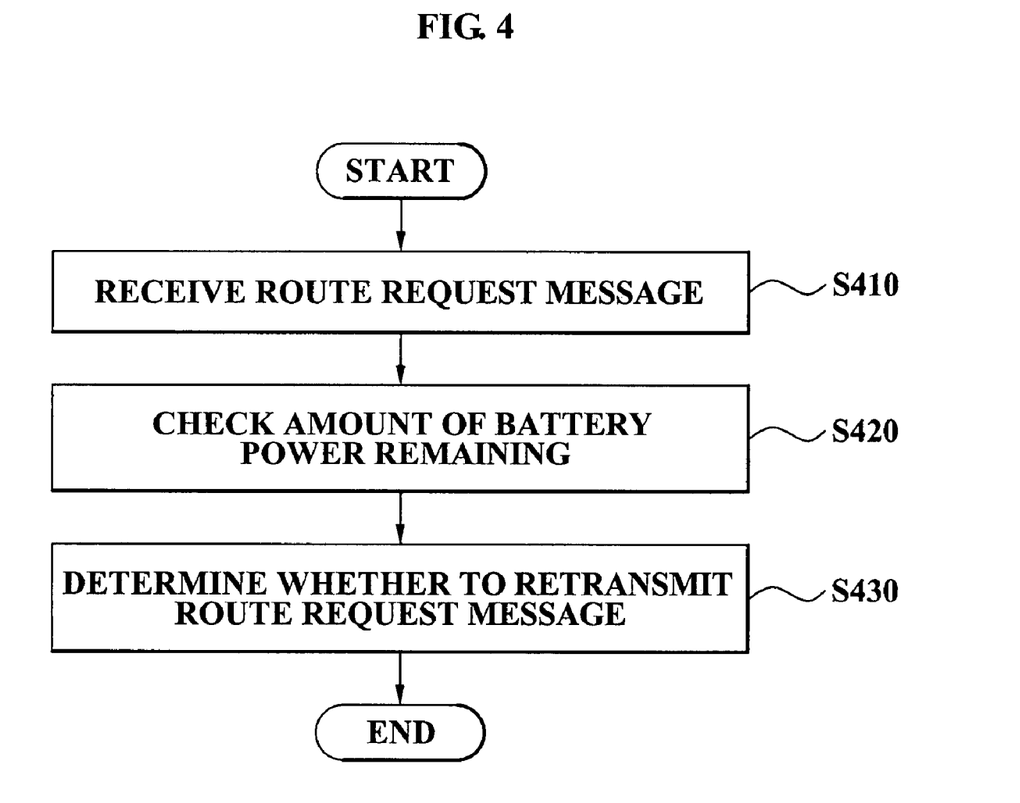
FIG. 4 is a flowchart illustrating an operation of a mobile terminal of an energy-aware routing apparatus according to an embodiment of the present invention.

FIG. 4 is a flowchart illustrating an operation of a mobile terminal of an energy-aware routing apparatus according to an embodiment of the present invention.

In operation S410, a mobile terminal 210 of FIG. 2 receives a route request message from nodes 223 and 229.

In operation S420, a control unit 211 in the mobile terminal 210 receives the route request message from a transceiving unit 213 in the mobile terminal 210, and checks an amount of battery power remaining in the mobile terminal 210.

In operation S430, the control unit 211 in the mobile terminal 210 determines whether to forward the route request message according to a result of the checking. Specifically, when the amount of battery power remaining is insufficient for routing, the control unit 211 does not forward the route request message. Accordingly, a base station 230 does not select a path having the mobile terminal 210, that is, does not select a path which includes a path from the node 229 to the base station 230 via the mobile terminal 210 and the node 223, as a communication path.

Also, updating hop-count information with hop-count information indicating a virtual hop number, is preferably further included in the energy-aware routing method. In this embodiment, the virtual hop number is preferably proportional to or otherwise based on an energy consumption status of the mobile terminal 210, but may be based on another variable or set of variables in the system. Also, the hop-count information counts a number of hops on configurable paths in the route request message, and is referred to by the base station 230 when routing.

FIGS. 3 and 4 are related to an energy-aware routing method according to an embodiment of the present invention. Also, an energy-aware routing apparatus according to an embodiment of the present invention described above with FIGS. 1 and 2 is applicable to FIGS. 3 and 4. Accordingly, more detailed description is omitted.

According to an aspect of the present invention, an energy-aware routing method and system use battery information when selecting a path which extends system lifetime and improves the stability of a data transmission path.

Also, according to an aspect of the present invention, an energy-aware routing method and system check memory status and the driving electrical power of a terminal when routing to improve the stability of a data transmission path.

While certain exemplary embodiments of the invention have been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. An energy-aware routing apparatus for use with a multi-hop system comprising at least one terminal and at least one base station, the apparatus comprising:
a transceiving unit that receives a route request message including battery information from each of the at least one terminal, the battery information indicating a battery power status of each of the at least one terminal as at least one of a high level, a medium level, a low level, and a critical level; and
a control unit that receives the route request message from the transceiving unit and selects a communication path from configurable paths by using the battery information.

2. The apparatus of claim 1, wherein the battery information further indicates at least one of a number of terminals with a high level status, a number of terminals with a medium level status, a number of terminals with a low level status, and a number of terminals with a critical level status, from a plurality of terminals on a single path.

3. An energy-aware routing apparatus for use with a multi-hop system comprising at least one terminal, at least one relay, and at least one base station, the apparatus comprising:
a transceiving unit that receives a route request message including energy-aware information from each of the at least one terminal or relay, the energy-aware information comprising battery information, the battery information indicating a battery power status of each of the at least one terminal as at least one of a high level, a medium level, a low level, and a critical level; and
a control unit that receives the route request message from the transceiving unit and selects a communication path from at least one configurable path by using the energy-aware information.

4. The apparatus of claim 3, wherein the battery information further indicates at least one of a number of terminals with a high level status, a number of terminals with a medium level status, a number of terminals with a low level status, and a number of terminals with a critical level status, from a plurality of terminals on a single path.

5. The apparatus of claim 4, wherein the control unit selects as the communication path a path having a terminal with a highest level status, the terminal being selected from among terminals with a lowest level status on each of the terminals' respective at least one configurable path.

6. The apparatus of claim 4, wherein the control unit selects as the communication path a path having a fewest number of terminals with a lowest level status on each of the at least one configurable path.

7. The apparatus of claim 3, wherein the energy-aware information includes at least one of hop-count information and relay number information, the hop-count information indicating a number of hops on the at least one configurable path, the relay number information indicating a number of relays on the at least one configurable path.

8. The apparatus of claim 7, wherein, when the number of relays is greater than or equal to 1, the control unit selects as the communication path one of a path having a smallest number of hops of the hop-count information from the at least one configurable path, and, when the number of hops is identical with respect to the at least one configurable path, a path having a greatest number of relays, and
wherein, when the number of relays of the relay number information is 0, the control unit selects as the communication path one of a path having the smallest number of hops of the hop-count information from the at least one configurable path, and, when the number of hops is identical with respect to the at least one configurable path, a path where the route request message is first received.

9. An energy-aware routing apparatus for use with a multi-hop system comprising at least one terminal, at least one relay, and at least one base station, the apparatus comprising:
a transceiving unit that receives a route request message and forwards the route request message according to a first control signal; and
a control unit that receives the route request message from the transceiving unit, checks an amount of battery power remaining, generates the first control signal which controls a retransmission of the route request message according to the amount of battery power remaining, and outputs the first control signal to the transceiving unit.

10. The apparatus of claim 9, wherein the control unit compares a threshold value, which is included in the route request message, and the amount of battery power remaining, and generates the first control signal to prevent the route request message from being forwarded when the amount of battery power remaining is less than the threshold value, or to forward the route request message when the amount of battery power remaining is greater than the threshold value.

11. The apparatus of claim 10, wherein the control unit inserts battery information in the route request message, and the battery information indicates the amount of battery power remaining as at least one of a high level, a medium level, a low level, and a critical level.

12. The apparatus of claim 9, further comprising:
a storing unit,
wherein the control unit generates a second control signal which controls a delay time prior to forwarding the route request message according to a remaining amount of the storing unit, and
wherein the transceiving unit forwards the route request message after delaying the route request message according to the second control signal.

13. The apparatus of claim 9, wherein the control unit checks an energy consumption status of the control unit and generates a third control signal which controls the retransmission of the route request message according to the energy consumption status of the control unit, and
wherein the transceiving unit forwards the route request message according to the third control signal.

14. The apparatus of claim 9, wherein the control unit updates hop-count information, which counts a number of hops on configurable paths, with the hop-count information reflecting a virtual hop count which is proportional to an energy consumption status of the control unit, the hop-count information being referred to by the base station when selecting a path.

15. An energy-aware routing method which is applied to a multi-hop system comprising at least one terminal, at least one relay, and at least one base station, the method comprising:
receiving a route request message including energy-aware information from each of the at least one terminal and relay, the energy-aware information including battery information, the battery information indicating a battery power status of each of the at least one terminal as at least one of a high level, a medium level, a low level, and a critical level; and
selecting a communication path from at least one configurable path by using the energy-aware information.

16. The method of claim 15, wherein the energy-aware information includes at least one of hop-count information and relay number information, the hop-count information indicating a number of hops on the at least one configurable path, the relay number information indicating a number of relays on the at least one configurable path,
wherein, when the number of relays of the relay number information is greater than or equal to 1, the selecting of the communication path comprises selecting as the communication path one of a path having a smallest number of hops of the hop-count information from the at least one configurable path, and, when the number of hops of the at least one configurable path is identical with respect to the at least one configurable path, a path having a greatest number of relays, and
wherein, when the number of relays of the relay number information is 0, the selecting of the communication path comprises selecting as the communication path one of a path having the smallest number of hops of the hop-count information from the at least one configurable path, and, when the number of hops is identical with respect to the at least one configurable path, a path where the route request message is first received.

17. An energy-aware routing method which is applied to a multi-hop system comprising at least one terminal, at least one relay, and at least one base station, the method comprising:
receiving a route request message in a transceiving unit;
checking an amount of battery power remaining when the route request message is received by a control unit from the transceiving unit, the checking of the amount being performed by the control unit; and
determining whether to forward the route request message according to the amount of battery power remaining, the determining being performed by the control unit.

18. The method of claim 17, further comprising:
updating hop-count information, which counts a number of hops on configurable paths in the route request message, with hop-count information reflecting a virtual hop number which is proportional to an energy consumption status of the control unit, the hop-count information being referred to by the base station when selecting a path.

19. A non-transitory computer readable medium of instructions that controls a transceiving unit and a control unit of a multi-hop system comprising at least one terminal, at least one relay, and at least one base station, the non-transitory computer readable medium of instructions comprising:
a first set of instructions that controls the transceiving unit to receive a route request message including energy-aware information from each of the at least one terminal and relay, the energy-aware information including battery information, the battery information indicating a battery power status of each of the at least one terminal as at least one of a high level, a medium level, a low level, and a critical level; and
a second set of instructions that controls the control unit to select a communication path from at least one configurable path by using the energy-aware information.

20. The non-transitory computer readable medium of instructions of claim 19, wherein the energy-aware information includes at least one of hop-count information and relay number information, the hop-count information indicating a number of hops on the at least one configurable path, the relay number information indicating a number of relays on the at least one configurable path,
wherein, when the number of relays of the relay number information is greater than or equal to 1, the second set of instructions controls the control unit to select as a communication path one of a path having a smallest number of hops of the hop-count information from the at least one configurable path, and, when the number of hops of the at least one configurable path is identical with respect to the at least one configurable path, a path having a greatest number of relays, and
wherein, when the number of relays of the relay number information is 0, the second set of instructions controls the control unit to select as a communication path one of a path having the smallest number of hops of the hop-count information from the at least one configurable path, and, when the number of hops is identical with respect to the at least one configurable path, a path where the route request message is first received.

21. A non-transitory computer readable medium of instructions that controls a transceiving unit and a control unit of a multi-hop system comprising at least one terminal, at least one relay, and at least one base station, the non-transitory computer readable medium of instructions comprising:
a first set of instructions that controls the transceiving unit to receive a route request message;

a second set of instructions that controls the control unit to check an amount of battery power remaining when the route request message is received; and a third set of instructions that controls the control unit to determine whether to forward the route request message according to the amount of battery power remaining.

22. The non-transitory computer readable medium of instructions of claim 21, further comprising:

a fourth set of instructions that controls the control unit to update hop-count information, which counts a number of hops on configurable paths in the route request message, with hop-count information reflecting a virtual hop number which is proportional to an energy consumption status of the control unit, the hop-count information being referred to by the base station when selecting a path.

* * * * *